M. JAEGER.
AUTOMATIC TRAP FOR MICE AND OTHER VERMIN.
APPLICATION FILED OCT. 11, 1912.

1,172,599. Patented Feb. 22, 1916.

Witnesses:
Inventor:
Michael Jaeger

UNITED STATES PATENT OFFICE.

MICHAEL JAEGER, OF DARMSTADT, GERMANY.

AUTOMATIC TRAP FOR MICE AND OTHER VERMIN.

1,172,599. Specification of Letters Patent. Patented Feb. 22, 1916.

Application filed October 11, 1912. Serial No. 725,261.

*To all whom it may concern:*

Be it known that I, MICHAEL JAEGER, a subject of the German Emperor, residing at Darmstadt, Grand Duchy of Hesse, German Empire, have invented certain new and useful Improvements in Automatic Traps for Mice and other Vermin, of which the following is a specification.

The object of the invention is an automatically resetting trap for mice and other vermin with a falling door or slide for closing the entrance to the trap. This door or slide is raised again into its open position by a tilting platform, and is held in this position by a see-saw bridge arranged in the trapping chamber of the trap. The present invention is distinguished from the known traps of this kind by the special construction of the tilting platform, and also by the combination of the latter with the falling slide or door of the trap entrance, by which means a simplification of the construction and a greater certainty in working is attained, while only a single intermediary member is provided for transferring the twisting movement of the see-saw arranged on the shaft of the tilting platform.

The drawings illustrate one form of construction of the invention.

Figure 1:
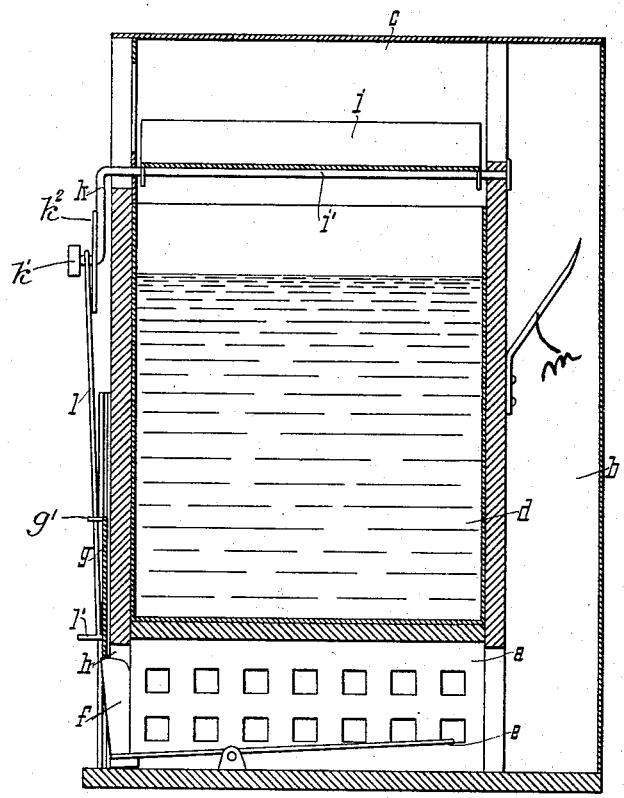
Figure 2:
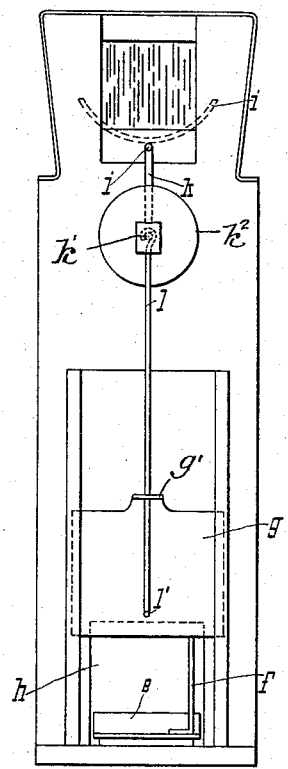
Figure 3:
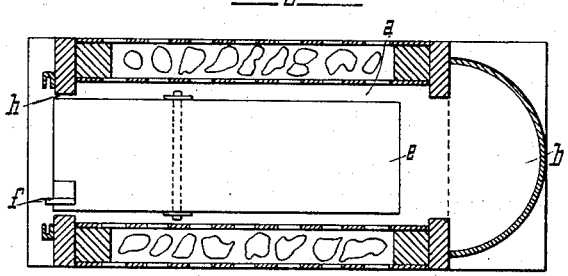

Figure 1 is a longitudinal section; Fig. 2 a front view; and Fig. 3 a horizontal section through the trapping chamber.

In the drawings $a$ is the trapping chamber of the trap and $b$ the vertical connecting passage to the chamber $c$, under which and on top of the trapping chamber is arranged the water container $d$. In the trapping chamber $a$ is arranged in known manner a see-saw $e$. The front portion of this see-saw automatically falls back and carries a prop or support $f$, which holds the falling slide $g$ for the opening $h$ of the trap in its open position. The tilting platform arranged over the water container comprises a rotatable axle $i^1$ arranged longitudinally with respect to the chamber $c$. This axle carries a specially formed floor or platform $i$, which after disturbance is always automatically brought back to its normal position by means of a counterweight $k^2$. This axle is provided with a crank $k$ lying in the same plane as the falling slide $g$, the crank forming the extension of the axle $i^1$. The crank pin $k^1$ carries the counterweight $k^2$. Attached to this crank $k$ is a connecting rod $l$ which loosely connects the tilting platform with the falling slide $g$, so that after the slide has been pulled up the connecting rod with this crank is again free to go back into its original position, and likewise the slide can fall down as soon as it is released by the support $f$. For this reason the slide is provided with a guide eye or ring $g^1$ through which the lower end of the connecting rod passes loosely, the end of the rod being arranged with a turned up lip or projection $l^1$ to engage with this ring.

The platform $i$ can turn to either side, as well to the right as to the left. In any case, in turning it thereby raises the connecting rod and with the latter the falling slide $g$. The turning movement produced by the fall of a trapped animal is sufficient to raise the falling slide to such a height that it can again rest on the support $f$ of the see-saw which automatically falls into its locking position.

In the vertical connecting chamber $b$, between the trap and the chamber, a safety flap $m$ is advantageously arranged in such a manner that the trapped animal is prevented from returning into the passage $b$ after having once passed said flap, by the pointed end thereof which will yield and allow the passage of the animal from $b$ to $c$ but will effectively prevent its return.

Having now particularly described and ascertained the nature of my said invention, and in what manner the same is to be performed, I declare that what I claim is:

An animal trap of the character described comprising in combination with the trap door thereof, a support for said door, an operating rod, a trough shaped tilting platform upon said rod, adapted to be tilted to either side of the same, a crank upon the shaft for said platform, a rod attached to said crank connecting the tilting platform with said door for raising the trap door to its seat upon the fall of a trapped animal from said platform.

In testimony whereof I affix my signature in presence of two witnesses.

MICHAEL JAEGER.

Witnesses:
 JEAN GRUND,
 CARL GRUND.